March 24, 1931. B. W. RUMBARGER 1,797,368
APPARATUS FOR PRODUCING LAMP BLACK
Filed April 18, 1929
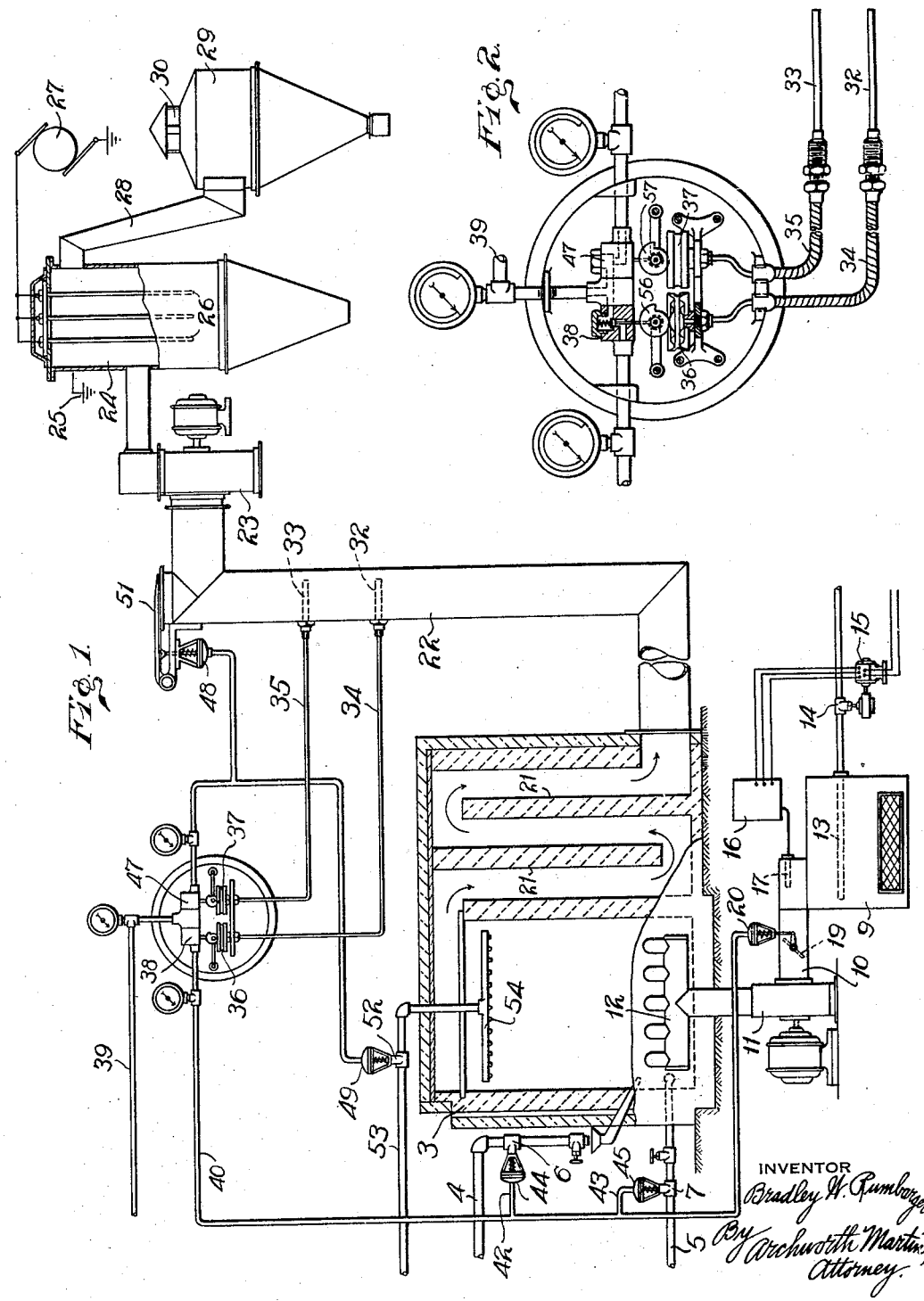

Patented Mar. 24, 1931

1,797,368

UNITED STATES PATENT OFFICE

BRADLEY W. RUMBARGER, OF MONROE, LOUISIANA, ASSIGNOR TO IMPERIAL OIL & GAS PRODUCTS COMPANY, OF PITTSBURGH, PENNSYLVANIA, A CORPORATION OF WEST VIRGINIA

APPARATUS FOR PRODUCING LAMPBLACK

Application filed April 18, 1929. Serial No. 356,090.

My invention relates to a process and apparatus for producing what is commonly termed lamp black or hydrocarbon black, such as formed through the partial combustion of natural gas, hydrocarbon vapors, certain resinous substances, etc.

One object of my invention is to provide an improved means in connection with a carbon black producing plant, for preventing overheating of the apparatus and safeguarding the products of combustion to keep the carbon black particles from being burned.

Another object of my invention is to provide means for automatically controlling both the volume of flame in a furnace or burner chamber and to control the distance which such flame will travel into the flue which leads from the furnace to the precipitator.

Still another object of my invention is to simplify and improve generally the art of producing carbon black.

One form of apparatus suitable for practicing my invention is shown in the accompanying drawing, wherein Figure 1 is a view partially in side elevation and partially in section, and Fig. 2 is a partial sectional view, on an enlarged scale, of a portion of the apparatus of Fig. 1.

Referring more particularly to Fig. 1, I show a furnace 3 wherein substances for producing carbon black may be partially consumed to produce fumes or gases which contain carbon black particles. In this furnace, I may burn sludge from oil cracking plants or oil or may burn vaporized hydrocarbon oil or natural gas, or both.

I have shown the furnace as provided with a source of hydrocarbon oil supply 4 and a gas supply 5. The flow of combustible fluids from the pipes 4 and 5 are controlled by valves 6 and 7 respectively, which normally remain open, but which will be automatically closed or partially closed upon increase in temperature resulting from the combustion of the products within the furnace, as hereinafter explained.

Air for assisting in the burning of the carbon black producing materials within the furnace may be drawn from the atmosphere through a humidifying box 9 and through a conduit 10 past a motor driven fan 11 and caused to discharge into a mixing chamber 12. In some instances, it is desirable to humidify this air somewhat, and I therefore provide a water spray 13 within the chamber 9, the supply of water to the spray 13 being controlled by a valve 14 which is in turn actuated by a motor 15, according to means well-known in the regulator art. The motor 15 is controlled by a hydrometer device 16 such as may be provided with a bulb 17 that is located in the path of the humidified air, as such air passes to the conduit 10, so that a definite percentage of moisture may automatically be maintained in the air drawn from the chamber 9.

The volume of air passing through the conduit 10 is controlled by a valve 19 which is actuated by a pressure diaphragm 20 in accordance with changes in temperature of the flue gases, as hereinafter explained, to automatically vary the rate of flow through the conduit 10 and the furnace 3.

The gaseous products of combustion upon leaving the furnace are directed past baffles 21 to a flue 22, the baffles 21 serving to normally prevent flames from entering the flue 22 and injuring the carbon particles contained in the gases. The gases are drawn through the flue 22 by means of a motor driven fan 23 and passed into a precipitator chamber 24 which is here shown as of the electrical type, but which may be in the form of well-known gas washing apparatus, if desired. The precipitator chamber is of metal so that its walls may serve as a collecting electrode and be connected to ground at 25. The discharge electrodes are indicated at 26 and are connected to a source of energy 27.

From the precipitator chamber 24, the gases are drawn through a conduit 28 by means of a rotary separator 29, wherein the remaining particles of carbon black are separated from the gases by centrifugal force, the clean or carbon-free gases being discharged through an opening 30 in the top of the separator chamber 29.

While the baffles 21 are intended to prevent, to a large extent, flames from entering the flue 22, a more certain and automatic control of the temperature and the length of travel of the flame is necessary. To this end, I provide thermostatic bulbs 32 and 33 in the flue 22. These bulbs may contain mercury, ether, or other vaporizable substances, and communicate through pipes 34 and 35 respectively with pressure diaphragm surfaces 36 and 37, as shown more clearly in Fig. 2. Thermo couple devices could be substituted for the thermostatic bulbs, if desired.

The diaphragm device 36 acts to raise the stem of a valve 38 so as to admit fluid pressure from a supply line 39 to a pipe 40 which will act upon a diaphragm in the valve device 20 to at least partially close the butterfly valve 19 and thereby reduce the supply of air to the furnace 3. It will be understood that this reduction in air supply, and hence in combustion within the chamber, is effected when the temperature in the flue 22 approaches a predetermined dangerous degree. The pipe 40 is provided with branches 42 and 43 that lead to diaphragm devices 44 and 45 respectively, for effecting control of the supply of oil and gas past the valves 6 and 7 respectively, such control of the fuel being of course effected simultaneously with the variation in air supply.

The valves 6, 7 and 19 are provided with springs which will return them toward open position upon reduction in temperature within the flue 22 and consequent contraction of the fluid in the bulb 32.

To still further control temperature within the furnace 3 and the stack 22, the bulb 33 which is designed to effect operation of the diaphragm device 37 at higher temperature than those at which the device 36 is operated, will, at predetermined abnormal temperatures, actuate a valve 47 which controls flow of motive fluid from the supply line 39 to diaphragms 48 and 49.

If, nothwithstanding the employment of the pressure device 32, the temperature within the furnace and the flue 22 increases above a safe point, the diaphragm 48 will be actuated to open a damper 51, and a valve 52 will be opened to admit water from a pipe 53 to a spray device 54 in the furnace to reduce the temperature within the burner chamber, the damper 51 and the valve 52 being of course returned by their springs to closed position upon reduction of temperature within the flue 22.

Cam discs 56 and 57 are interposed between the diaphragms 36 and 37 and the valves 38 and 47, so that upon turning of these cam discs to adjusted positions, the temperatures at which the valves 38 and 47 will be actuated may be fixed.

While I hereinafter claim the apparatus as a lamp black producing apparatus, it will be understood that the term "lamp black" is employed in a broad sense to include also other materials such as carbon black and hydrocarbon black.

I claim as my invention:—

1. Lamp black producing apparatus comprising a burner chamber having an outlet for the gases of combustion, baffles located adjacent to the outlet of the chamber, a separating chamber, a flue leading from the said outlet to the separating chamber, a blower located between the said chambers, for maintaining a flow of gases through said flue, a damper located exteriorly of the flue and arranged to establish communication between said flue and the atmosphere, thermostatic means acted upon directly by increase in temperature within the flue, for controlling the supply of combustible material to the said furnace, and thermostatic means operated by increase in temperature within the flue, for opening said damper.

2. Lamp black producing apparatus comprising a burner chamber having an outlet for the gases of combustion, baffles located adjacent to the outlet of the chamber, a separating chamber, a flue leading from the said outlet to the separating chamber, a blower located between the said chambers, for maintaining a flow of gases through said flue, a damper located exteriorly of the flue and arranged to establish communication between said flue and the atmosphere, thermostatic means acted upon directly by increase in temperature within the flue, for controlling the supply of combustible material to the said furnace, and thermostatic means operated by increase in temperature within the flue for opening said damper, the second named thermostatic means being operable only at temperatures in excess of those at which the first named thermostatic means operates.

In testimony whereof I, the said BRADLEY W. RUMBARGER, have hereunto set my hand.

BRADLEY W. RUMBARGER.